(12) United States Patent
Pfitzner

(10) Patent No.: US 7,506,069 B2
(45) Date of Patent: Mar. 17, 2009

(54) ACCESSING DATA IN A COMPUTER NETWORK

(75) Inventor: Ingo Pfitzner, Berlin (DE)

(73) Assignee: SAP AG, Walldorf (DE)

( * ) Notice: Subject to any disclaimer, the term of this patent is extended or adjusted under 35 U.S.C. 154(b) by 880 days.

(21) Appl. No.: 10/422,752

(22) Filed: Apr. 25, 2003

(65) Prior Publication Data

US 2004/0215825 A1 Oct. 28, 2004

(51) Int. Cl.
G06F 15/16 (2006.01)
G06F 17/00 (2006.01)
G06F 17/20 (2006.01)

(52) U.S. Cl. .................. 709/246; 709/217; 709/219; 715/249

(58) Field of Classification Search ............ 709/246, 709/245, 219, 217, 203; 715/249
See application file for complete search history.

(56) References Cited

U.S. PATENT DOCUMENTS

| | | | |
|---|---|---|---|
| 6,119,165 A | 9/2000 | Li et al. | |
| 6,167,441 A | 12/2000 | Himmel | |
| 6,260,050 B1 * | 7/2001 | Yost et al. ............... | 715/501.1 |
| 6,301,617 B1 | 10/2001 | Carr | |
| 6,345,279 B1 * | 2/2002 | Li et al. .................. | 707/104.1 |
| 6,360,262 B1 | 3/2002 | Guenthner et al. | |
| 6,430,624 B1 * | 8/2002 | Jamtgaard et al. ......... | 709/246 |
| 6,453,353 B1 | 9/2002 | Win et al. | |
| 6,466,966 B1 | 10/2002 | Kirsch et al. | |
| 6,470,027 B1 | 10/2002 | Birrell, Jr. | |
| 6,505,254 B1 | 1/2003 | Johnson et al. | |
| 6,584,466 B1 * | 6/2003 | Serbinis et al. ............. | 707/10 |
| 7,349,929 B2 * | 3/2008 | Pfitzner ................... | 707/203 |
| 2001/0029525 A1 * | 10/2001 | Lahr ...................... | 709/218 |
| 2002/0073236 A1 * | 6/2002 | Helgeson et al. ........... | 709/246 |

(Continued)

FOREIGN PATENT DOCUMENTS

WO 99/57866 11/1999

(Continued)

OTHER PUBLICATIONS

Bickmore, et al.; "Digestor: device-independent access to the World Wide Web"; Computer Networks and ISDN Systems; *North Holland Publishing*, Amsterdam, NL, vol. 29, No. 8-13; pp. 1075-1082 (Sep. 1, 1997).

(Continued)

*Primary Examiner*—Ario Etienne
*Assistant Examiner*—Philip J Chea
(74) *Attorney, Agent, or Firm*—Fish & Richardson P.C.

(57) ABSTRACT

In a complex network of computer systems and computing devices, the same data may be accessible by more than one computer program. Each computer program may be able to structure and arrange the date for use with a particular computing environment. A single reference address that is independent of the computer program used to structure and arrange the business data may be used to access business data. The location-independent reference address is translated to a reference address associated with a computer programs that is able to access the business data in the desired format. The translation of the single reference address is based on information about the computing environment from which the request was made. The translation of the single reference address also may be based on user preferences.

47 Claims, 7 Drawing Sheets

U.S. PATENT DOCUMENTS

2002/0107891 A1* 8/2002 Leamon et al. ............. 707/513
2003/0050931 A1* 3/2003 Harman et al. ............. 707/100
2004/0049574 A1* 3/2004 Watson et al. ............... 709/224

FOREIGN PATENT DOCUMENTS

WO          01/55913        8/2001
WO          WO 01/55913     8/2001

OTHER PUBLICATIONS

Fielding et al, "Hypertext Transfer Protocol—HTTP/1.1", *MIT/LCS*, Jan. 1997, 126 pages.

* cited by examiner

ACCESSING DATA IN A COMPUTER NETWORK

TECHNICAL FIELD

This description relates to accessing data in a network of computer systems and computing devices.

BACKGROUND

Computing devices are often used to access and display business data located on computers. Examples of business data include information about a product sale, information about a business meeting, an organization, or a person. Business data relating to the same entity or event may be stored on multiple computers, including computer systems, such as an enterprise application computing system, a desktop general-purpose computer, a laptop general-purpose computer, and computing devices, such as a personal digital assistant (PDA). In some cases, this business data related to the same event or entity and stored on multiple computer systems and computing devices may be structured and arranged in the same manner. In other cases, this business data may be structured and arranged differently for display on, and use by, different types of computer systems and computing devices.

For example, when a sales invoice for a particular sale is displayed and used on a desktop computer system accessing an enterprise application that includes the sales invoice, all of the information for the sales invoice may be displayed. Similarly, when the sales invoice is displayed on a laptop computer accessing business data stored on the laptop computer, all of the information for the sales invoice may be displayed. However, when the sales invoice is displayed on a PDA or other type of device with a limited display capacity, storage capacity, or processing capacity, the information displayed for the sales invoice may be reduced, or substantially reduced, than when information for the sales invoice is displayed using a laptop computer or desktop computer.

A reference address, such as a uniform resource locator (URL), can be used to identify a particular collection of business data related to a particular event or a particular entity that is located on a particular computer system or a particular computing device. When collections of business data relate to the same event or entity and are located on multiple computer systems and computing devices, many reference addresses may be used to identify business data that relate to the same event or entity. For example, a reference address may be used to identify a particular sales order stored on a customer-relationship management server, and a different reference address may be used to identify the same sales order stored on a mobile device. When business data may be stored on many different types of computer systems and computing devices, many different reference addresses may be used to identify the business data.

Some of the reference addresses may not be usable by some types of computer systems or computing devices. For example, a reference address that identifies business data stored on a laptop computer may only be accessible to the laptop computer itself. In another example, data stored on an enterprise application computer system that is structured and arranged for display on a general-purpose computer, such as a desktop computer or laptop computer, may not be usable or able to be displayed on a PDA. This may be due, for example, to the difference in processing, storage, and display capabilities in the computing environments between the general-purpose computer and the PDA.

In some cases, one (or some) of the reference addresses may be preferable for accessing business data from a particular type of computing environment. For example, an end user using a laptop computer may prefer to access business data that is stored locally on the laptop computer rather than business data stored on an enterprise application server that is accessible using a network connection to the laptop computer. This may be, for example, because accessing the locally stored data may be faster.

To access the business data stored in multiple computer systems, one of the many possible reference addresses must be selected. Often this may be accomplished by presenting to the end user a list of the reference addresses that may be used to access the business data and asking the end user to make a selection from the list of possible reference addresses. In such cases, the end user needs to be able to differentiate the reference addresses presented for selection so that the end user may select the most appropriate, or otherwise preferred, reference address from the list of possible reference addresses. One reference address may be more appropriate than other reference addresses, for example, based on the computing capabilities of computing device (e.g., screen display capabilities, processing capability, and storage capacity), the type of software available on the computing device, and the type of access used to access the business data (e.g., remote versus local access to business data stored). These characteristics may be referred to as the computing environment.

A reference address also can be used to identify a computer program that is located on a particular computer system or a particular computing device. In some cases, a reference address may be used to identify a method that structures and arranges business data for display on and use by a particular type of computer system or computing device. A different reference address may be used to identify another method that structures and arranges the same business data for display on and use by a different type of computer system or computing device. To access the business data so that the business data is structured and arranged for a particular type of computer system or computing device, one of the possible reference addresses must be selected.

SUMMARY

Generally, the invention provides the capability to translate, based on computing environment information, a reference address to a different reference address that identifies the location of a computer program to structure and arrange a business object for display and use by a particular type of computer system or computing device. Examples of a computer program include (but are not limited to) a procedure, a function, a method or another collection of executable instructions. One area where the invention may find specific applicability is in accessing a particular business data object in a complex landscape of networked computing systems and computing devices, many of which have different capabilities and require business data structured and arranged for particular storage, display or processing capabilities. A single reference address that is independent of the computer program used to structure and arrange the business data may be used to access business data. The single reference address is translated to a reference address associated with a particular method that is able to structure and arrange the business data in the desired format. The translation of the single reference address is based on information about the display device associated with the request. This may spare an end user from the need to understand the meaning of the various reference addresses and relieve the end user of the burden of selecting one reference address from a list of possible reference addresses, some of which may not be usable by the computer system or computing device being used by the end user.

In one general aspect, the invention provides for redirecting a request to access data to a computer program capable of providing the requested data in a desired format or from a desired storage location, when more than one computer program is able to access the requested data. Each computer program is able to appropriately structure and arrange the data for display or use on a particular computing environment. A reference address identifies the location of each computer program. A computer-program-independent reference address is received, as is computing environment information for a computer seeking access to data identified by the received reference address. The received reference address is translated, based on the received computing environment information, to a second reference address that identifies a computer program able to appropriately structure and arrange the requested data for display or use on the computer seeking access to data identified by the received reference address.

Implementations may include one or more of the following features. For example, the computer may be a computer system or a computing device. The more than one location on which the data is stored may include multiple computers at different physical locations. The data identified by the second reference address may be accessed using the computer program. A parameter may be provided, based on the received computer environment information, to the computer program.

The received reference address or the second reference address may be a uniform resource locator. The uniform resource locator may be received from a web browser operating on the computer seeking access to data identified by the received uniform resource address. The data may be accessed using the computer program identified by the second uniform resource address.

A redirection decision rule may be accessed. The received reference address may be translated based on the received computing environment information and the accessed redirection decision rule. The redirection decision rule may associate the received reference address and the received computing environment information with a second reference address. When the computing environment information includes a display device parameter, the redirection decision rule may associate the received reference address and the received display device parameter with a second reference address that identifies the storage location of the computer program that is able to appropriately structure and arrange the data for display or use on a display device having the received display device parameters. When the computing environment information includes information describing a software operating environment, the redirection decision rule may associate the received reference address and the received information describing the software operating environment with a second reference address that identifies the storage location of the computer program that is able to appropriately structure and arrange the data for display or use on a computer having the described software operating environment. The information describing a software operating environment may include information describing an operating system for a computer or a run-time application environment for a computer. When the computing environment information includes hardware information, the redirection decision rule may associate the received reference address and the received information describing the software operating environment with a second reference address that identifies the storage location of the computer program that is able to appropriately structure and arrange the data for display or use on a computer having hardware that corresponds to the received hardware information. The redirection decision rule may be modifiable by a user.

A user identity may be received. The received user identity may be a user name or may identify a group of users. When a user identity is received, the reference address may be translated based on the received computing environment information and the received user identity.

In another general aspect, redirecting a request to access data in a computer network having multiple computers, including computer systems and computing devices, that are capable of providing the requested data. The request includes sending a reference address and computing environment information for a computer seeking access to data identified by the sent reference address. The translation, based on the sent computing environment information, of the sent reference address to a second reference address that identifies the storage location of a computer program that is able to appropriately structure and arrange the data for display or use on the computer seeking access to data identified by the received reference address may be enabled.

Implementations may include one or more of the features noted above and one or more of the following features. For example, a user identity for use in translating the sent reference address to a second reference address may be sent. The sent reference address may be a uniform resource locator.

Implementations of the techniques discussed above may include a method or process, a system or apparatus, or computer software on a computer-accessible medium. The details of one or more implementations of the invention are set forth in the accompanying drawings and the description below. Other features, objects, and advantages of the invention will be apparent from the description and drawings, and from the claims.

DETAILED DESCRIPTION

Figure 1:
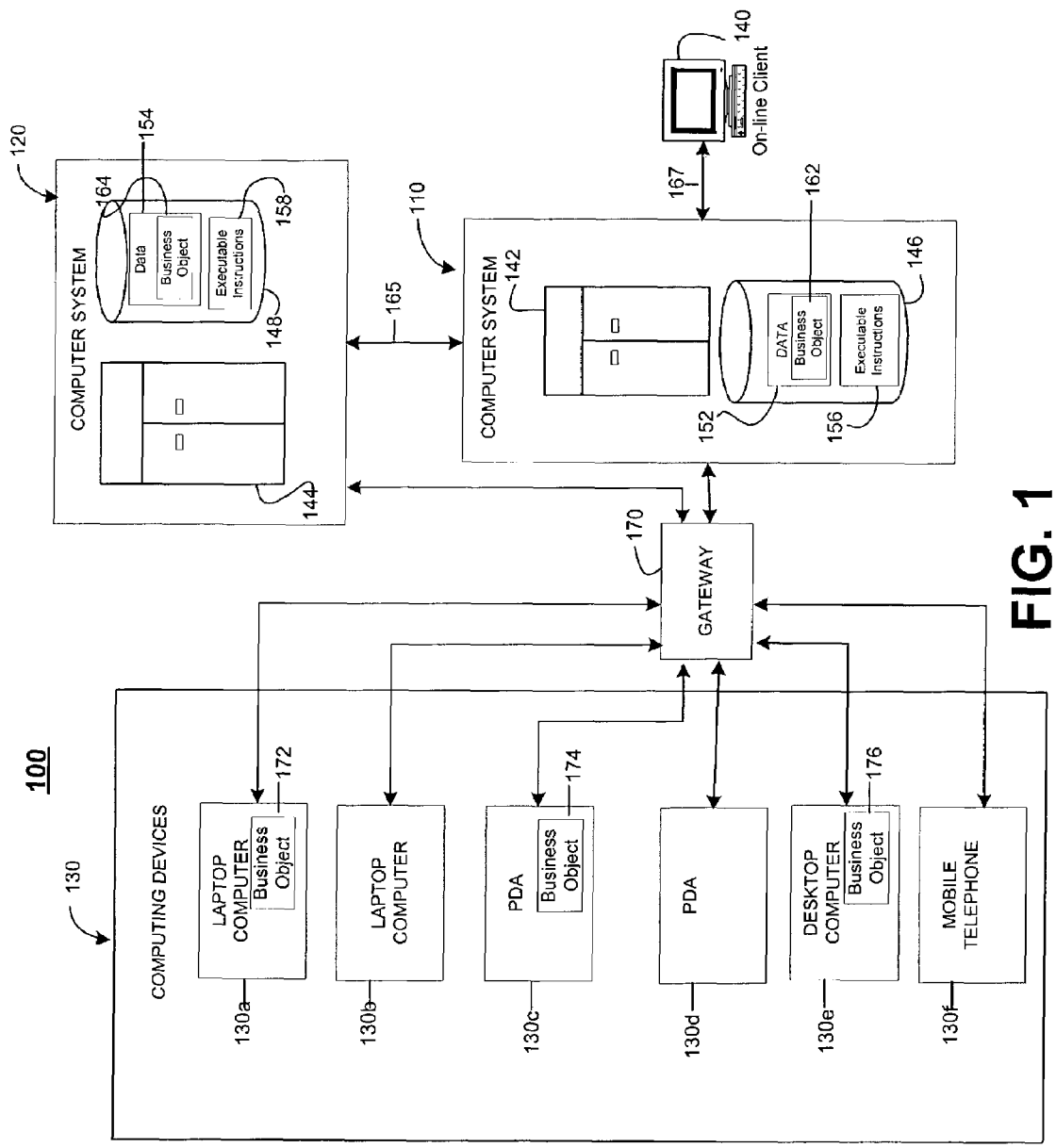
FIG. 1 is a block diagram of a system incorporating various aspects of the invention.

FIG. 1 shows a block diagram of a system 100 of networked computers, including computer systems 110 and 120, computing devices 130, and an online client 140, all of which are capable of executing instructions on data. Each of the computing devices 130 are capable of translating a reference address to another reference address and using the translated reference address to access data. In some cases, the accessed data is stored on the device itself, and in other cases, the accessed data is stored on one of the networked computer systems 110 or 120. The reference address translation is based on the computing environment of the computing device that requested access to the data.

Similarly, the computer systems 110 and 120 are capable of translating, based on the computing environment information, a reference address to another reference address and using the translated reference to access data. As is conventional, computer system 110 or 120 includes a server 142 or 144 and a data storage device 146 or 148 associated with each server. Each of the data storage devices 146 and 148 includes data 152 or 154 and executable instructions 156 or 158. A particular portion of data, here referred to as a business object 162 or 164, is stored in computer systems 110 and 120, respectively. A business object is a collection of data attribute values, and typically is associated with a principal entity represented in a computing device or a computing system. Examples of a business object include information about a customer, an employee, a product, a business partner, a product, a sales invoice, and a sales order. A business object may be stored as a row in a relational database table, an object instance in an object-oriented database, data in an extensible mark-up language (XML) file, or a record in a data file. A reference address is associated with each business object 162 or 164. The computer systems 110 and 120 are capable of delivering and exchanging data through a communication pathway 165.

The computer system 110 includes an on-line client 140 that is connected to the computer system 110 through a communication pathway 167. The on-line client 140 and the computer system 110 may be arranged to operate within or in concert with one or more other systems, such as, for example, one or more LANs ("Local Area Networks") and/or one or more WANs ("Wide Area Networks"). The on-line client 140 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). For brevity, FIG. 1 illustrates only a single on-line client 140 for computer system 110.

Computer system 110 or 120 may be accessed by a variety of remote computing devices 130 that are connected through a communication gateway 170 to the computer system 110 or 120. Examples of computing devices 130 include laptop computers 130a and 130b, PDAs 130c and 130d, a desktop computer 130e, and a mobile telephone 130f. Some of the remote computing devices, such as laptop computer 130a, PDA 130c, and desktop computer 130e, store business object 172, 174 or 176, respectively, used by the remote computing device. Each of these computing devices periodically synchronizes the business object 172, 174 or 176 stored on the computing device with the business object 162 stored on the computer system 110 and/or the business object 164 stored on the computer system 120.

Some of the remote computing devices, such as laptop computer 130b, PDA 130d, and mobile telephone 130f do not store the business objects used by the computing device. Each of these computing devices accesses business object 162 or 164 stored on computer system 110 or computer system 120, as may the computing devices 130a, 130c, and 130e that store business objects 172, 174 or 176. Thus, when a computing device 130a, 130c, or 130e accesses a business object, the computing device may access the business object stored locally or may access the business object stored remotely on computer system 110 or 120.

A reference address is associated with each business object 162, 164, 172, 174, or 176. In this implementation, the business objects 162, 164, 172, 174, and 176 stored on the computing devices 130a, 130c, and 130e and on the computer systems 110 and 120 are each stored in a database.

The communication gateway 170 may connect to one of the computing devices 130 through the Internet, the World Wide Web, WANs, LANs, analog or digital wired and wireless telephone networks, satellite, and/or any other delivery mechanism for carrying data. The communication gateway 170 may connect through, for example, a wired, wireless, cable, or satellite communication pathway. The communication gateway 170 receives and routes messages between the computing devices 130 and the computer systems 110 and 120. The communication gateway 170 reads the headers of messages it receives and uses forwarding tables to determine the computer system to which the received messages are to be sent. The communication gateway 170 also includes a switch that determines the path that the message will follow to the computer system to which the message is being sent. The communication gateway 170 also serves as a firewall to prevent unauthorized access to computer systems 110 and 120.

In the example of a customer relationship management application, an end user may use one of the computing devices 130 to enter new customer information, prepare bids for a customer, enter a product order for a customer, or schedule a meeting, while operating in an off-line mode and not connected to computer system 110 or 120. As the business data is entered by the user, the business data is stored locally, for example, as a business object 172, 174 or 176. Periodically, such as once or twice a day, the end user uses the computing devices 130 to send entered and stored business data (here, business object 172, 174 or 176) to the computer system 110, which operates a centralized version of the customer relationship management application program. The computer system 110 stores the received business data as business object 162.

In general, when an end user of a computing device or an on-line client seeks to access business data, the end user is presented with a list of possible reference addresses that may be used to access a business object. The end user selects, or otherwise indicates, from the list of possible reference addresses a reference address that identifies the business object to be accessed using one of the computing devices 130 or the on-line client 140. The computing device (or on-line client 140) redirects the access request from the reference address used by the end user to identify the business object to be accessed. The access request is redirected, based on the computing environment of the computing device (or on-line client 140), to a second reference address. In this manner, the end user is not burdened with selecting one of several possible reference addresses used to access the business data.

More specifically, when an end user of laptop computer 130a seeks to access business data stored on system 100, the end user is presented with a list of possible reference addresses that may be used to access a business object. The end user indicates from the list of possible reference addresses a reference address that identifies the business data to be accessed. Based on the computing environment information of the laptop computer 130a, the laptop computer 130a redirects the data access request to use the business object 172 stored locally on the laptop computer 130a. In contrast, when an end user of laptop computer 130b seeks to access business data, the laptop computer 130b redirects, based on the computing environment information of the laptop computer 130b, the data access request to use business object 162 stored on the computer system 110. Each laptop computer 130a or 130b redirects the data access request based on whether the business data is available in local storage of the laptop computer 130a or 130b. Examples of a redirection process are described more fully in FIGS. 2-4.

Figure 2:
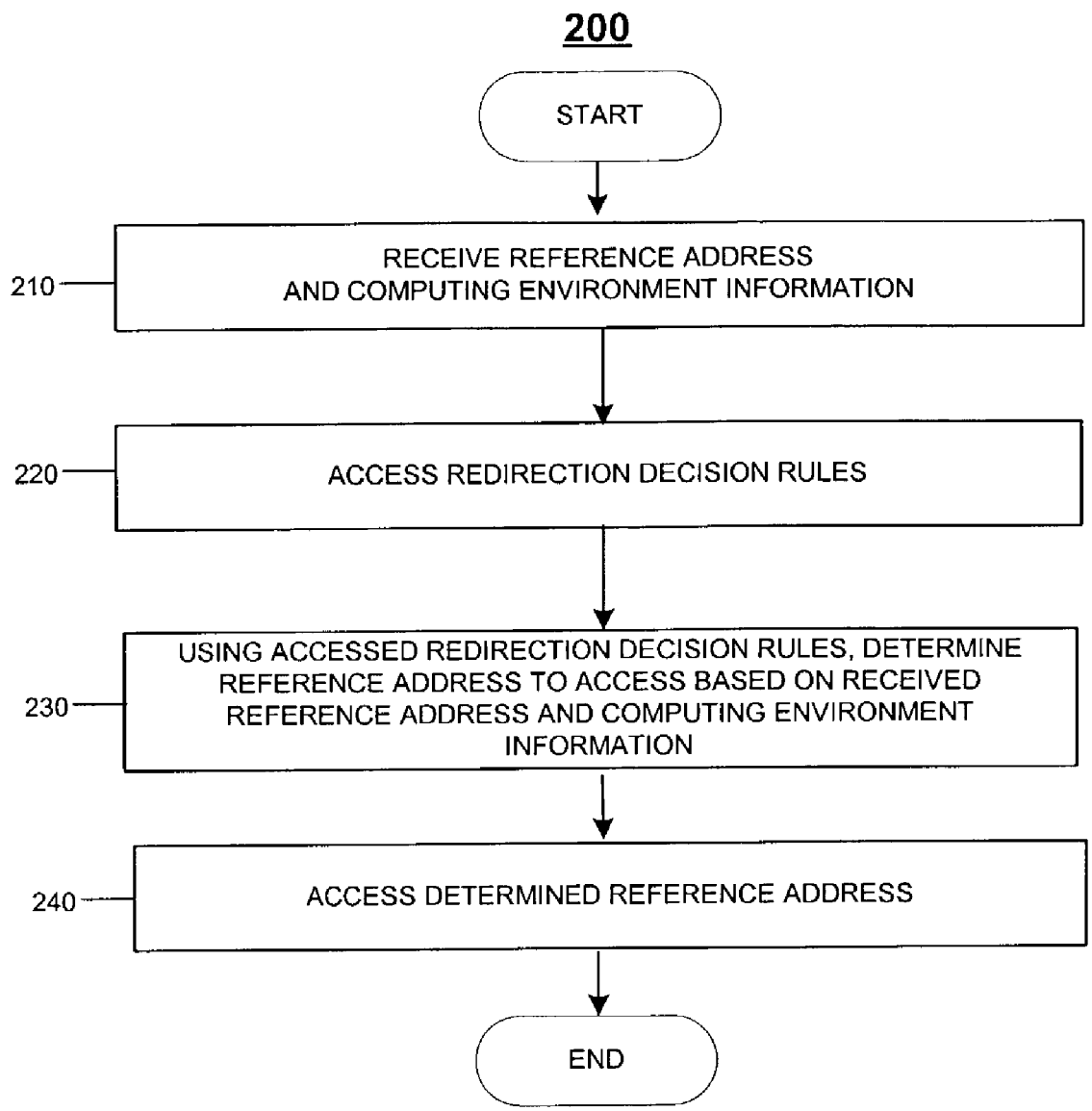
FIG. 2 is a flow chart of a process to determine a reference address based on computing environment information.

FIG. 2 illustrates a redirection process 200 to determine a reference address based on computing environment information. The redirection process 200 may be performed by a processor on a computing device, such as one of computing devices 130 in FIG. 1, or by a processor on a computing system, such as computer system 110 or 120 in FIG. 1. The redirection process 200 begins when a reference address and computing environment information is received by the processor (step 210). The computing environment information may be configuration information or other information, for example, that identifies the type of device, the operating system used by the device, and characteristics or capabilities of the device (such as the size or type of a display associated with the device, the amount of storage available on the device, or whether particular types of information are stored on the device).

The processor then accesses redirection decision rules (step 220). The redirection decision rules may be a list or table of decision logic that associates a received reference address and computing environment information with a translated reference address, as depicted in the table below.

| Received Reference Address | Computing Environment Information | Translated Reference Address |
| --- | --- | --- |
| Reference address A that indicates business object A | Laptop computer with local storage of business object A | Reference address C to access business object A stored locally on, and formatted for, a personal computer. |
| Reference address A that indicates business object A | Desktop computer with local storage of business object A | Reference address D to access business object A stored locally on, and formatted for, a personal computer. |
| Reference address A that indicates business object A | Laptop computer without local storage of business object A | Reference address E to access business object A stored on a computer server and formatted for a personal computer. |
| Reference address A that indicates business object A | Desktop computer without local storage of business object A | Reference address E to access business object A stored on a computer server and formatted for a personal computer. |
| Reference address A that indicates business object A | PDA without local storage of business object A | Reference address F to access business object A stored on a computer server and formatted for a PDA. |
| Reference address A that indicates business object A | PDA with local storage of business object A | Reference address G to access business object A stored locally on a PDA and formatted for a PDA. |
| Reference address A that indicates business object A | Mobile telephone without local storage of business object A | Reference address H to access business object A stored on a computer server and formatted for a mobile telephone. |
| Reference address B that indicates business object B | Laptop computer with local storage of business object B | Reference address I to access business object B stored locally on, and formatted for, a personal computer. |
| Reference address B that indicates business object B | Desktop computer with local storage of business object B | Reference address J to access business object B stored locally on, and formatted for, a personal computer. |

For example, the received reference address may identify the type of business object to be accessed, such as a sales order, customer information, or an appointment. The computing environment information may indicate the type of computing device (here, a laptop computer, a desktop computer, a PDA, or a mobile telephone) and whether the business data is available locally on the computing device. In some implementations, the computing environment may include the operating system used by the computing device, such as a version of the Windows operating system by Microsoft Corporation of Redmond, Wash., a version of the Macintosh operating system by Apple Computer of Cupertino, Calif., or a version of the Red Hat Linux operating system by Red Hat of Raleigh, N.C. The computing environment also may include the type of web browser, or other type of software used to access the data identified by the reference address, that is used by the computing device. In some implementations, display capabilities of the computing device may be included. For example, computing environment information such as whether a business object is to be accessed using computing device with a limited display area (such as a PDA) or a mobile telephone with a limited display area.

Using the accessed redirection decision rules, the processor determines the reference address to access the business object using the received reference address and the received computing environment information (step 230). This may be accomplished, for example, by looking up (or otherwise accessing) in the redirection decision rules the received reference address and the received computing environment information (or a portion thereof) to determine a particular translated reference address.

The processor then accesses the business object using the determined reference address (step 240). This may be accomplished, for example, by generating a remote procedure call to a program or method at the location indicated by the reference address. This also may be accomplished by invoking a hyperlink in a mark-up language to the determined reference address.

In this manner, a reference address that is appropriate for the computing environment of the device that is used to access the business object may be determined from the received location-independent reference address. The translation of a location-independent reference address may be particularly beneficial in a complex landscape of computer systems and computing devices that include differing display, processing or storage capabilities. Using process 200, the location-independent reference address is dynamically allocated to a reference address of a particular business object at runtime. The dynamic allocation is performed at runtime by using redirection decision rules to determine an appropriate or preferred reference address for the business object based on the computing environment of the requesting computing device or the requesting computer system.

Figure 3:
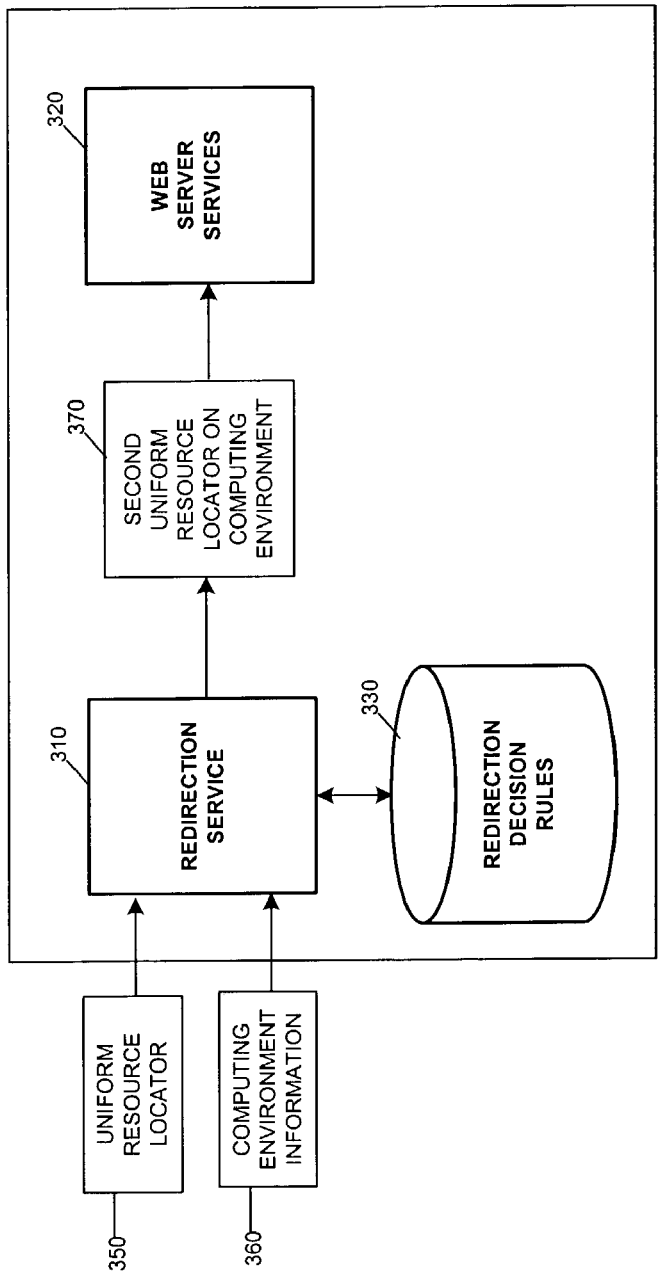
FIG. 3 is a block diagram of the components of a software architecture for redirecting a reference address based on computing environment information.

FIG. 3 depicts the components of a software architecture 300 for redirecting a reference address based on computing environment information. FIG. 3 uses a particular web-based implementation for illustrative purposes. The software architecture 300 may be used to implement the redirection process 200 described in FIG. 2. The software architecture 300 may be implemented, for example, as a web server operating on computer system 110, computer system 120, or one of the computing devices 130, all of FIG. 1.

The software architecture 300 includes a redirection service 310, web server services 320, and redirection decision rules 330. The web server services 320 are services available from a conventional web server, such as a server operating a version of Internet Information Server by Microsoft Corporation of Redmond, Wash. or an Apache server that operates web server software available in the public domain. The web server services 320 also may be a subset of conventional web server services that includes a conventional redirection service that redirects a reference address to another reference address using a one-to-one relationship between the received reference address and redirected reference address. The redirection decision rules may be stored using a relational database management system that is capable of being accessed through a web server. Examples of such a relational data management system include SQLServer by Microsoft Corporation of Redmond, Wash. and Oracle Database by Oracle Corporation of California. Alternatively or additionally, the redirection decision rules also may be stored as an XML ("Extensible Mark-up Language") document. XML is a language similar to HTML but with the additional flexibility of being able to describe data structures that can be processed directly as data by a program. The decision rules may be stored directly in an XML document or may be stored in an XSLT (extensible stylesheet language) stylesheet that is accessed using, and applied to, an XML document.

The redirection service 310 receives a uniform resource locator 350. A uniform resource locator or URL is a form of address used by the hypertext mark-up language (HTML) to access an object, such as data and other types of resources, identified by the address. As such, a URL is both an address and a request to access the data identified by the address. A URL may refer to an object that is stored locally to the computing device or may refer to an object that is available on the World Wide Web (or the web) or is otherwise accessible using the Internet Protocol (IP). In general, the first part of the URL indicates what protocol to use, and the second part of the URL specifies the IP address or the domain name where the resource is located. The redirection service 310 also receives computing environment information 360, such as the computing environment information described previously with respect to steps 210 and 230 in FIG. 2.

The redirection service 310 accesses the redirection decision rules 330 and determines a second URL to be used to access the data indicated by the received URL 350 and based on the received computing environment information 360, as described previously with respect to step 230 in FIG. 2. The second URL 370 determined by the redirection service 310 is provided to the web server service 340. The web server service 340 then accesses the second URL 370.

Figure 4:
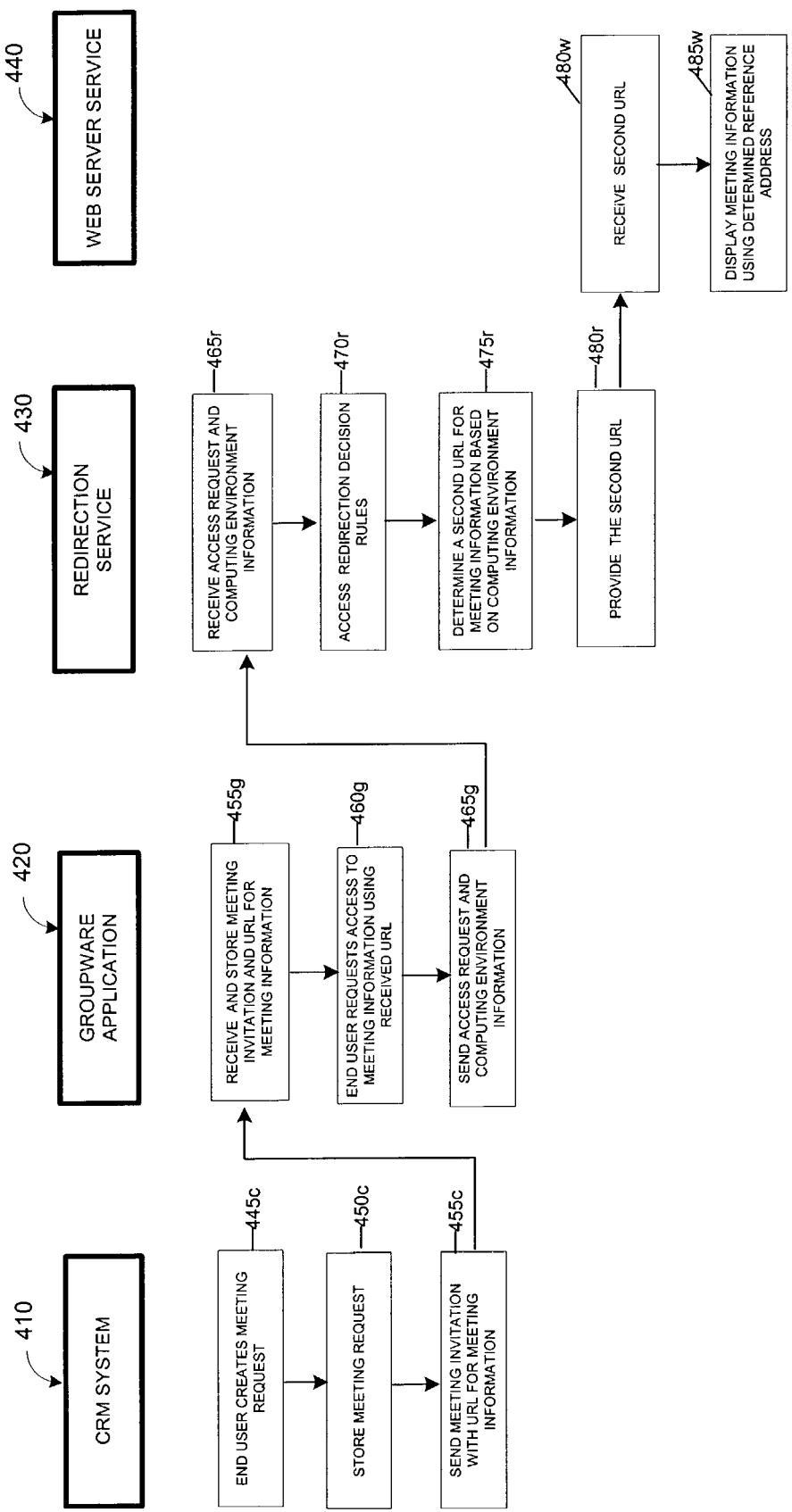
FIG. 4 is a diagram illustrating communications between a to translate a reference address to a second address using computing environment information.

Referring to FIG. 4, a redirection process 400 involves a CRM system 410, a groupware application 420, a redirection service 430, and a web server service 440. The CRM system 410 may be the computer system 110 in FIG. 1. The groupware application 420 is operating on a computing device, such as one of the computing devices 130 in FIG. 1, and capable of communicating with the CRM system 410. The groupware application may include contact, appointment, and/or task information (groupware data) from the CRM system. The redirection service 430 may be the redirection service 310, and the web server service 440 may be the web server service 340, both of which are illustrated in FIG. 3. The redirection service 430, the web server service 440 and the groupware application 420 are all located on the same computing device.

The redirection process 400 begins when an end user creates a meeting request in the CRM system 410 (step 445c). This may be accomplished, for example, when an end user uses a laptop computer to access a centralized CRM system. The end user initiates the sending of a request to the CRM system 410 to create a meeting request.

The CRM system 410 stores the meeting request (step 450c), and sends to a groupware application on a mobile device 420 a meeting invitation that includes a URL for meeting information (step 455c). The ability to include additional meeting information may be particularly useful when more information is known about a particular meeting than is indicated by a meeting invitation. For example, additional meeting materials, such as an agenda and a presentation, for a particular meeting may be available in the CRM system, and not available in the meeting invitation. The URL where the additional meeting materials are located in the CRM system may be included in the meeting invitation. The CRM system may send the meeting invitation to a groupware server, which provides the meeting invitation to the groupware application 420 through, for example, a synchronization process that occurs between the groupware application and the groupware server. Examples of a groupware server include a Microsoft Exchange Server by Microsoft Corporation of Redmond, Wash. and a Lotus Domino Groupware Server by IBM Corporation of White Plains, N.Y.

The groupware application 420 receives and stores the meeting invitation, including the URL for the additional meeting information (step 455g). Using the groupware application 420, the end user requests access to the meeting information using the received URL (step 460g). For example, the end user may click on a hyperlink included in the meeting request to access additional information about the meeting, such as an agenda or a presentation. The groupware application 420 sends to the redirection service 430 the access request along with computing environment information (step 465g).

The redirection service 430 receives the access request and the computing environment information (step 465r). This may be accomplished, for example, by using a URL that identifies a method, or other type of computer program or software, that is invoked when the URL is selected. The method calls the redirection service 430 and provides the computing environment information. The computing environment information may be received with the invoked URL. Alternatively, the redirection service 430 may perform a remote procedure call or otherwise access configuration information on the device used by the end user.

The redirection service 430 then accesses redirection decision rules (step 470r), and determines a second URL for the meeting information based on received the computing environment information (step 475r). The redirection service 430 may accomplish steps 465r-475r, for example, by using the redirection process described previously with respect to FIGS. 2 and 3. The redirection service 430 then sends to the web server service 440 the second URL (step 480r).

The web server service 440 receives the second URL (step 480w) and displays the meeting information using the second URL (step 485w). This may be accomplished, for example, by accessing the meeting information using the second URL and sending the meeting information to a browser located on the client device accessing the groupware application 420 for display.

Using redirection process 400, an end user of a computing device may access a the meeting information that is stored on the CRM system without knowing the particular reference address that is the most appropriate for the computing device used by the end user to access the meeting information.

In some implementations, the redirection decision rules used may vary based on a particular end user or a group of end users. For example, a particular end user may wish first to access data stored on the user's local computing device and only seek access business data elsewhere when the business data is not available locally. In contrast, another end user may wish to access business data remotely first and only try to access local data when the remote access is not available, or otherwise fails. When redirection decision rules are applied based on a particular user's identity as a particular user or as a member of a group of users, the redirection service 430 also must receive, or otherwise determine, the identity of the user associated with the request to access data.

In another example, sales information, such as a sales quote, a sales order, or notes concerning a sales call, may be associated with a particular meeting in the CRM system 410. The sales information may be associated with a meeting invitation using a location-independent URL to identify the sales information. An end user may access the sales information by using a pointing device to click (or otherwise indicate) the location-independent URL. Based on the type of computing device or computer system used by the end user, the location-independent URL is translated into a location-based URL that is used to access the sales information. For example, when the end user is using a PDA, a URL that identifies the sales information structured and arranged for display and use on a PDA is used. In contrast, when the end user is using a laptop computer, a URL that identifies the sales information structured and arranged for display and use on a laptop computer is used.

Figure 5:
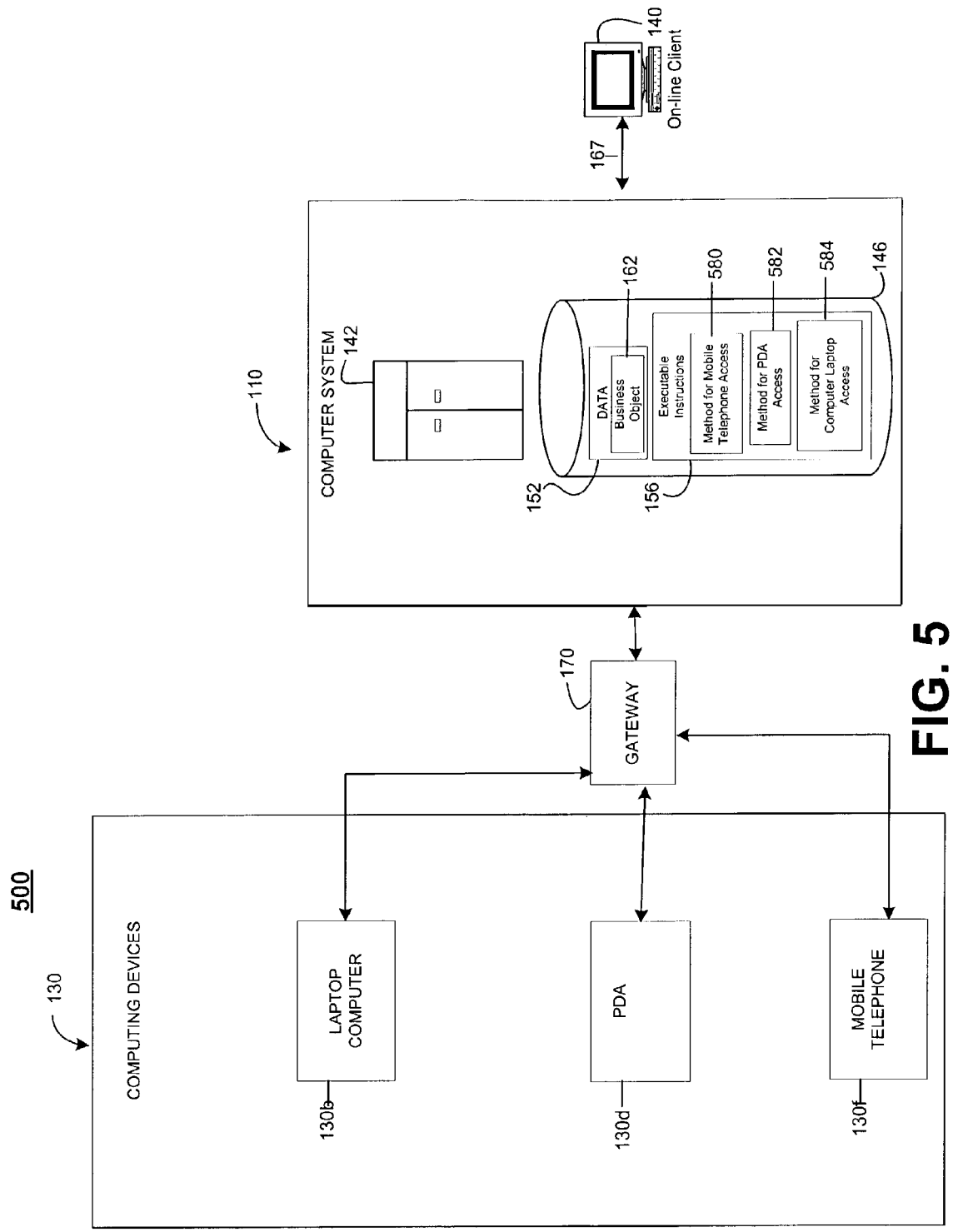
FIG. 5 is a block diagram of a system for translating a reference address based on computing environment information.

Using the structure and arrangement of FIG. 1, FIG. 5 illustrates a system 500 of networked computers in which a reference address may be translated, based on computing environment information, to a different reference address that identifies the location of a computer program to structure and arrange the business data for display and use by a particular type of computer system or computing device. Examples of a computer program include (but are not limited to) a procedure, a function, a routine, a method or other collection of executable instructions.

In contrast to the system 100 of FIG. 1, the system 500 includes a business object 162 that is stored in only one location. Specifically, the business object 162 is stored only on computer system 110. The remote computing devices—the laptop computer 130*b*, the PDA 130*d*, and the mobile telephone 130*f*—do not store the business objects used by the computing device.

Each of these computing devices accesses the business object 162 stored on the computer system 110 using a different method 580, 582 or 584. Each method structures and arranges the business data in business object 162 for appropriate display and use by the different remote computing devices 130. Specifically, the method 580 structures and arranges the business object 162 for display and use by a mobile telephone, such as the mobile telephone 130*f*. A mobile telephone may have a very limited display area, such as a display area that is only able to display two lines, and the method 580 structures and arranges the business data object 162 appropriately. The method 582 structures and arranges the business object 162 for display and use by a PDA, such as the PDA 130*d*. For example, a PDA may be able to display only five lines, and the method 582 structures and arranges the business data in business object 162 appropriately for a five line display. Similarly, the method 584 structures and arranges the business object 162 for display and use by a laptop computer, such as the laptop computer 130*b*. The laptop computer, for example, may have a much greater display and processing capability than either of the PDA 130*d* or the mobile telephone 130*f*. The method 584 structures and arranges the business data for the capabilities of the laptop computer 130*b*. Each of method 580, 582 and 584 is associated with a different reference address.

The computer system 110 translates a reference address associated with business object 162 to a reference address associated with the method 580, 582 or 584. The translation is based on the computing environment information of the computing device from which the access request originated. The translation is performed, for example, by using a redirection process 200 of FIG. 2 or redirection process 400 of FIG. 4. More specifically, when an end user of the laptop computer 130*b* seeks to access business object 162, the end user selects a reference address associated with business object 162. Based on the computing environment information of the laptop computer 130*b*, the computer system 110 translates the request to the reference address associated with method 584 that structures and arranges the business object 162 for display on and use by a laptop computer. To translate the request, the computer system 110, for example, may access a redirection decision rule that associates the reference address associated with business object 162, the reference address associated with the method 584, and the computing environment information that corresponds to the computing environment for which the business object 162 is structured and arranged by the method 584. In some implementations, the reference address for the method 584 also may be associated with the business object 162.

Similarly, when an end user of the PDA 130*d* seeks to access business object 162, the end user selects a reference address associated with business object 162. The reference address associated with business object 162 is the same reference address selected by the end user of the laptop computer 130*b*. Based on the computing environment information of the PDA 130*d*, the computer system 110 translates the request to the reference address associated with method 582 that structures and arranges the business object 162 for display on and use by a PDA.

When an end user of the mobile telephone 130*f* seeks to access business object 162, the end user selects a reference address associated with business object 162. The reference address associated with business object 162 is the same reference address selected by the end user of the laptop computer 130*b* and selected by the end user of the PDA 130*d*. Based on the computing environment information of the mobile telephone 130*f*, the computer system 110 translates the request to the reference address associated with method 580 that structures and arranges the business object 162 for display on and use by a mobile telephone.

In some implementations, in addition to translating a received reference address to reference address for a method that appropriately structures and arranges the data for display, a parameter may be provided to the method based on the computing environment information received. This may be useful, for example, when a method is able to structure and arrange data for different computing environments. The particular computer environment for which the method structures and arranges data is determined when the method is invoked and is based on a parameter received. In such a case, the redirection process, based on the received computing environment information, translates a received reference address to a second reference address that identifies a method and also provides the method with a parameter to identify the particular computer environment for which the method is to structure and arrange data.

The techniques have been described as translating, based on computing environment information, a reference address to a different reference address that identifies the location of a business object or a method to access a business object. The techniques are applicable to other contexts. In one example, based on a user identity, a reference address may be translated to a particular version of a word processing document. This may be useful when the author of a particular word processing document wishes to access a version of the word processing document that is being revised. In contrast, an individual who is using (and not authoring) the word processing document wishes to access a previous version of the document. When the user identity is identified as an author, a reference address for a word processing document may be translated to the location of the word processing document that is undergoing revision. When the user identity is not identified as an author, the reference address for the word processing document may be translated to the location of the word processing that is not being revised.

Figure 6:
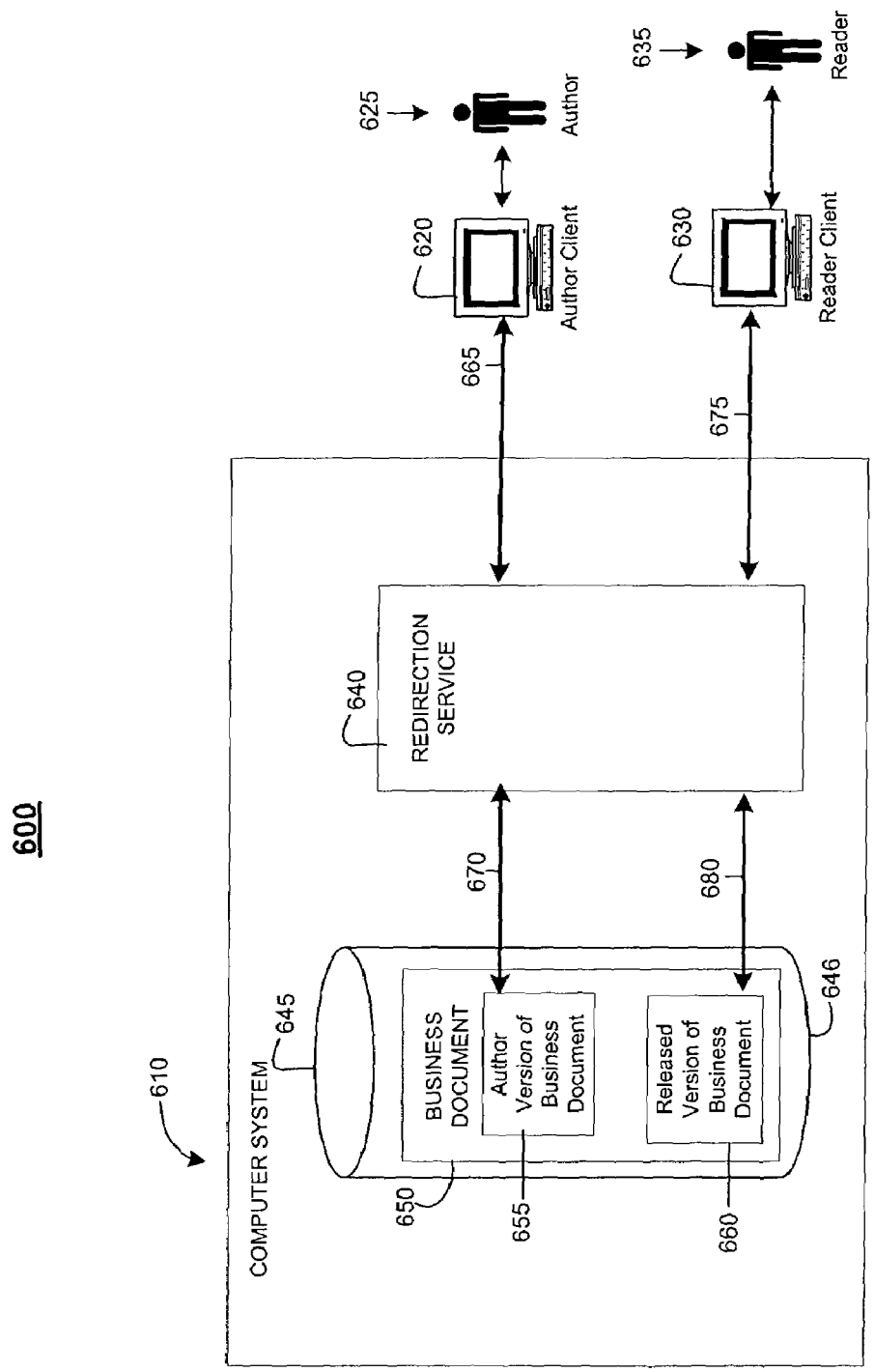
FIG. 6 is a block diagram of a system for translating a reference address based on information identifying the user who requested access to the data identified by the reference address.

FIG. 6 illustrates a system 600 for translating a requested reference address based on information identifying the requester. The system 600 includes a computer system 610, a client system 620 that is used by a user 625 who is an author of a business document, and a client system 630 that is used by a user 635 who is only a reader (that is, not an author) of the business document. The computer system 610 includes a redirection service 640, such as the redirection service 310 of FIG. 3, and a data storage device 645 having two versions of the same business document 650—an author version 655 of the business document that is being revised by the author 625 and a released version 660 of the business document that is available to the reader 635 and is not undergoing revision. Although FIG. 6 illustrates both versions of the business document 655 and 660 as being stored on the same computer system, some implementations may store versions of the same business document on different computer systems, different computing devices, or on a combination of computer systems and computing devices.

Using the author client 620, the author 625 requests access to a particular business document, here business document 650, identified by a reference address. The author client 620 sends a data access request, including a reference address of the business document 650 and a user identifier associated with the author 625, over communication pathway 665 to the redirection service 640 of the computer system 610. Based on the received reference address for the business document 650 and the received information identifying the user who requested access to the business document 650, the redirection service 640 identifies the user as the author of the business document 650 and redirects, using communication pathway 670, the access request to the reference address for the author version 655 of the business document 650.

In contrast, using the reader client 630, the reader 635 requests access to the business document 650 using the same reference address as used by the author 625 to access the business document. The reader client 630 sends a data access request including a reference address of the business document 650 and a user identifier associated with the reader 635, over communication pathway 675 to the redirection service 640 of the computer system 610. Based on the received reference address for the business document 650 and the received information identifying the reader 635 as the requester of the business document, the redirection service 640 identifies the user as only a reader (not an author) of the business document 650 and redirects, using communication pathway 680, the request to the reference address for the released version 660 of the business document 650.

The techniques for redirecting a request for data access based on user identity also may be used to translate, based on user identity, a reference address for access to a particular application program to a different reference address for a particular version of the application program. This may be particularly useful in a software development or software testing context in which a software developer and an end user need access to different versions of an application program. A software developer accesses a version of an application program that is being developed or tested. In contrast, an end user accesses a previous version of the application program that is generally deployed or otherwise released for general use. For example, when a user identity is identified as a software developer, a reference address for an application program may be translated to a reference address for a development version of the application program. When a user identity is identified as an end user, the reference address for the application program may be translated to a reference address for the production version of the application program.

In another example, a reference address for a business object may be translated to another reference address based on whether the business object has been archived to a storage location for long-term storage. For example, a particular business object may be removed from an operational database to an archival location for long-term storage. Based on the location of the business object and whether the user seeking access is permitted access to the archival location, the reference address may be translated to a reference address for the business object in operational storage or a different reference address for the business object in archival storage.

Figure 7:
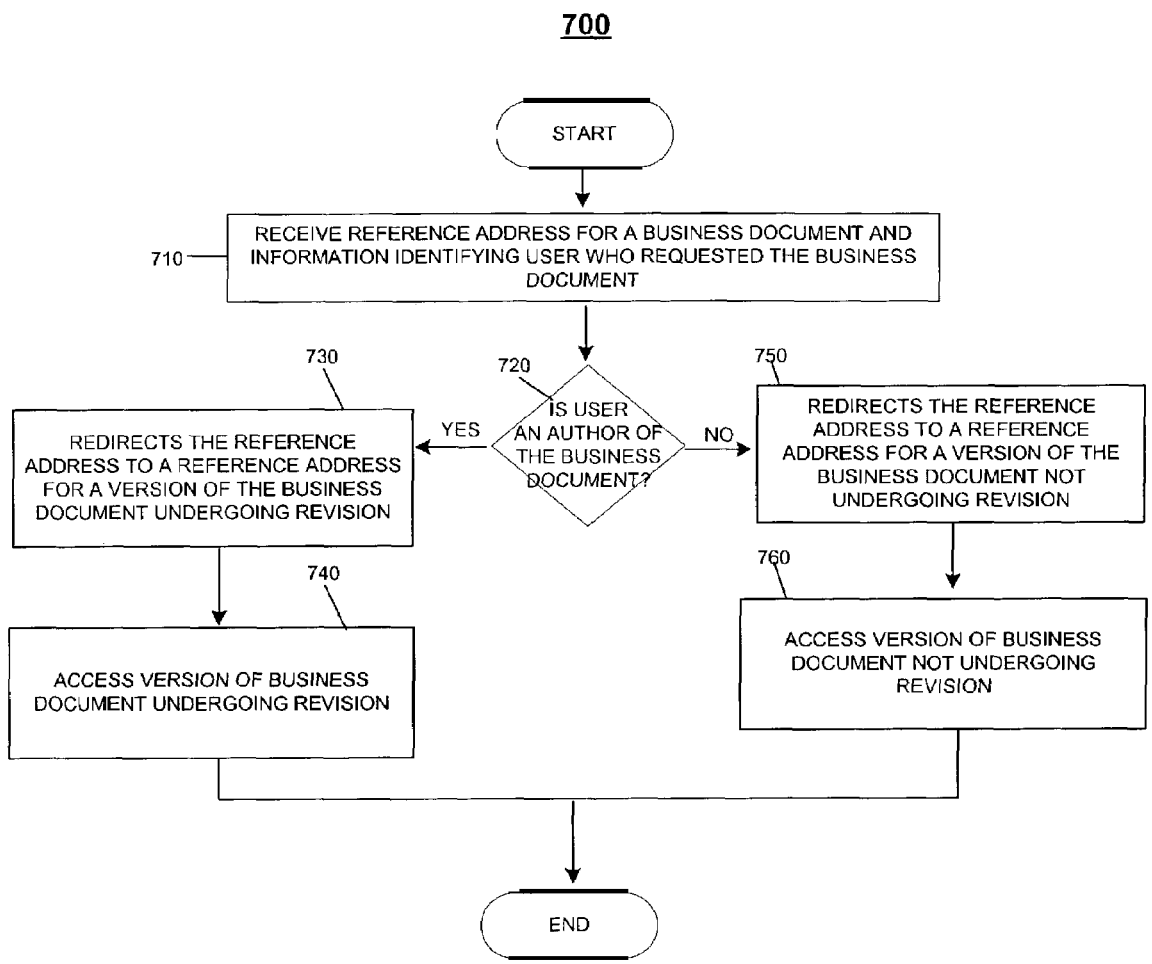
FIG. 7 is a flow chart of a process to access a business document based on a requested reference address and information identifying the user who requested the business document.

FIG. 7 is a flow chart of a process 700 to access a business document based on a requested reference address and information identifying the user who requested access. The redirection process 700 may be performed by a processor on a computing device, such as one of computing devices 130 in FIG. 1, or a processor of a computing system, such as computer system 110 or 120 in FIG. 1 or computer system 610 in FIG. 6. The redirection process 700 begins when a reference address for a particular business document for which multiple versions exist and information identifying the user who requested the business document is received by the processor (step 710). The information identifying the user may, for example, by a user identifier or a user name. The processor then determines whether the user who requested the business document is the author or is otherwise authorized to revise and modify the business document (collectively, "author") (step 720). The processor may access a list, table, or other collection of data that associates a business document with users who are permitted to revise the document. For example, a database table may store a list of business documents, in which each business document is identified by a reference address (or another type of document identifier) and is associated with information identifying the user, such as the name of the author or the user identifier of the author. Alternatively, the processor may be able to determine whether the user is the author of a particular business document by accessing the business document itself. For example, the processor may be able to identify author information embedded in the business document by a word processing program used to create and edit the business document. The processor then may be able to determine whether the user is the author of the business document based on whether the author information from the business document corresponds to the received user identity information.

When the user who requested the business document is the author (step 720), the processor redirects the received reference address request to a different reference address for the version of the business document that is undergoing revision (step 730). This may be accomplished, for example, through the use of business document information in which each business document reference address that may be received from a user is associated with two reference addresses: one reference address for the business document that is undergoing revision and another reference address for the business document that is not undergoing revision. The processor translates the received reference address to an appropriate reference address based on the role of the user identity. Here, the processor translates the received reference address to a reference address for the business document that is undergoing revision. The processor then accesses, using the translated reference address, the version of the business document that is undergoing revision (step 740) and the process 700 ends. In some implementations, the processor also may notify the user that the version undergoing revision is being accessed.

In contrast, when the processor determines that the user who requested the business document is not the author of the business document (step 720), the processor redirects the received reference address to a different reference address for the version of the business document that is not undergoing revision (step 750). The processor then accesses the business document that is not undergoing revision (step 760) and the process 700 ends. In some implementations, the processor also may notify the user that the version is undergoing revision and that version being accessed is not undergoing revision.

In some implementations, the processor may determine whether multiple versions of the requested business document exist, and if so, which the version that is under revision. To do so, the processor may access a list of business documents in which the list identifies for each business document, the versions of the business document that exist and identifies a version of the business document that is being revised.

A number of implementations of the invention have been described. Nevertheless, it will be understood that various modifications may be made without departing from the spirit and scope of the invention. Accordingly, other implementations are within the scope of the following claims.

What is claimed is:

1. A method for accessing data in a computer network, the method comprising:

receiving a reference address and computing device type information for a computing device seeking access to data identified by the received reference address wherein the data is accessible by multiple computer programs, each computer program being identified by a reference address and able to access the identified data and programmatically structure and arrange the accessed data for display or use on one or more particular computing device types, the multiple computer programs including at least a first computer program that is able to programmatically structure and arrange the accessed data for display or use on multiple computing device types and a second computer program that is able to programmatically structure and arrange the accessed data for display or use on a single computing device type;

determining a computing device type for the computing device seeking access to the data identified by the received reference address based on the received computing device type information;

based on the determined computing device type, selecting, from among the multiple computer programs, a computer program that is able to access the data identified by the received reference address and programmatically structure and arrange the accessed data for display or use on the determined computing device type for the computing device seeking access to the data identified by the received reference address;

translating, based on the received, the received reference address to a second reference address that identifies the selected computer program that is able to access the data identified by the received reference address and programmatically structure and arrange the accessed data for display or use on the computing device seeking access to the data identified by the received reference address;

determining whether the selected computer program is able to programmatically structure and arrange the accessed data for display or use on multiple computing device types or only a single computing device type;

conditioned on a determination that the selected computer program is able to programmatically structure and arrange the accessed data for display or use on multiple computing device types, redirecting the received reference address to the second reference address and providing, to the selected computer program identified by the second reference address, a parameter that identifies the determined computing device type for the computing device seeking access to the data to enable the selected computer program to access the data identified by the received reference address and programmatically structure and arrange the accessed data for display or use on the one of the multiple computing device types corresponding to the determined computing device type; and conditioned on a determination that the selected computer program is able to programmatically structure and arrange the accessed data for display or use on only a single computing device type, redirecting the received reference address to the second reference address without providing, to the selected computer program identified by the second reference address, a parameter that identifies the determined computing device type for the computing device seeking access to the data.

2. The method of claim 1 wherein the data is stored on multiple computers at different physical locations.

3. The method of claim 1 further comprising accessing the data using the computer program identified by the second reference address.

4. The method of claim 1 wherein the received reference address comprises a uniform resource locator.

5. The method of claim 4 wherein the uniform resource locator is received from a web browser operating on the computing device seeking access to data identified by the received uniform resource locator.

6. The method of claim 1 wherein the second reference address comprises a second uniform resource locator.

7. The method of claim 6 further comprising accessing data using the computer program identified by the second uniform resource locator.

8. The method of claim 7 wherein accessing data using the computer program identified by the second uniform resource locator comprises accessing data using the computer program identified by the second uniform resource locator by using a web server redirection service with the second uniform resource locator.

9. The method of claim 1 further comprising accessing a redirection decision rule wherein translating the received reference address comprises translating the received reference address based on the computing device type and the accessed redirection decision rule.

10. The method of claim 9 wherein the redirection decision rule associates the received reference address and the computing device type with a second reference address.

11. The method of claim 10 wherein:
the computing device type information further comprises a display device parameter, and
the redirection decision rule associates the received reference address and the received display device parameter with a second reference address that identifies the storage location of the computer program that is able to appropriately structure and arrange the data for display or use on a display device having the received display device parameters.

12. The method of claim 10 wherein:
the computing device type information further comprises information describing a software operating environment, and
the redirection decision rule associates the received reference address and the received information describing the software operating environment with a second reference address that identifies the storage location of the computer program that is able to appropriately structure and arrange the data for display or use on a computer having the described software operating environment.

13. The method of claim 12 wherein the information describing a software operating environment comprises information describing an operating system for a computer.

14. The method of claim 12 wherein the information describing a software operating environment comprises information describing a run-time application environment for a computer.

15. The method of claim 10 wherein:
the computing device type information further comprises hardware information, and
the redirection decision rule associates the received reference address and the received information describing the hardware with a second reference address that identifies the storage location of the computer program that is able to appropriately structure and arrange the data for display or use on a computer having hardware corresponding to the received hardware information.

16. The method of claim 9 further comprising modifying the redirection decision rule based on user input.

17. The method of claim 9 further comprising receiving a user identity wherein translating the received reference address comprises translating the received reference address based on the received computing device type and the received user identity.

18. The method of claim 17 wherein the received user identity comprises a user name.

19. The method of claim 17 wherein the received user identity comprises a user identity that identifies a group of users.

20. A method for redirecting a request to access data in a computer network having multiple computers, including computer systems and computing devices, that are capable of providing the requested data, the method comprising:
receiving a uniform resource locator and computing device type information for a computing device seeking access to a business object identified by the received uniform resource locator wherein the business object is accessible by multiple computer programs, each computer program being identified by a uniform resource locator and able to access data representing the business object and programmatically structure and arrange the accessed data representing the business object for display or use on one or more particular computing device types, the multiple computer programs including at least a first computer program that is able to programmatically structure and arrange the accessed data representing the business object for display or use on multiple computing device types and a second computer program that is able to programmatically structure and arrange the accessed data representing the business object for display or use on a single computing device type;
determining a computing device type for the computing device seeking access to the business object identified by the received uniform resource locator based on the received computing device type information;
based on the determined computing device type, selecting, from among the multiple computer programs, a computer program that is able to access the data representing the business object identified by the received uniform resource locator and programmatically structure and arrange the accessed data representing the business object for display or use on the determined computing device type for the computing device seeking access to the business object identified by the received uniform resource locator;
translating, based on the selected computer program, the received uniform resource locator to a second uniform resource locator for the selected computer program that is able to access the data representing the business object identified by the received uniform resource locator and programmatically structure and arrange the accessed data representing the business object for display or use on the computing device seeking access to data identified by the received uniform resource locator;
determining whether the selected computer program is able to programmatically structure and arrange the accessed data representing the business object for display or use on multiple computing device types or only a single computing device type;
conditioned on a determination that the selected computer program is able to programmatically structure and arrange the accessed data representing the business object for display or use on multiple computing device types, redirecting the received uniform resource locator to the second uniform resource locator and providing, to the selected computer program identified by the second uniform resource locator, a parameter that identifies the determined computing device type for the computing device seeking access to the data to enable the selected computer program to access the data representing the business object identified by the received uniform resource locator and programmatically structure and arrange the accessed data representing the business object for display or use on the one of the multiple computing device types corresponding to the determined computing device type; and
conditioned on a determination that the selected computer program is able to programmatically structure and arrange the accessed data representing the business object for display or use on only a single computing device type, redirecting the received uniform resource locator to the second uniform resource locator without providing, to the selected computer program identified by the second uniform resource locator, a parameter that identifies the determined computing device type for the computing device seeking access to the data.

21. The method of claim 20 further comprising accessing the data using the computer program identified by the second uniform resource locator.

22. The method of claim 20 further comprising accessing a redirection decision rule wherein translating the received uniform resource locator comprises translating the received uniform resource locator based on the computing device type and the accessed redirection decision rule.

23. The method of claim 22 wherein the redirection decision rule associates the received reference address and the computing device type with a second reference address.

24. The method of claim 23 wherein receiving the uniform resource locator and computing device type information comprises receiving the uniform resource locator and computing device type information from a web browser operating on the computing device seeking access to data identified by the received uniform resource locator.

25. The method of claim 22 wherein the redirection decision rule is modifiable by a user.

26. A method for redirecting a request to access data in a computer network having multiple computers, including computer systems and computing devices, that are capable of providing the requested data, the method comprising:

sending a reference address and computing device type information for a computing device seeking access to data identified by the received reference address wherein the data is accessible by multiple computer programs, each computer program being identified by a reference address and able to access the identified data and programmatically structure and arrange the accessed data for display or use on one or more particular computing device types, the multiple computer programs including at least a first computer program that is able to programmatically structure and arrange the accessed data for display or use on multiple computing device types and a second computer program that is able to programmatically structure and arrange the accessed data for display or use on a single computing device type;

enabling determination of a computing device type for the computing device seeking access to the data identified by the sent reference address based on the sent computing device type information;

enabling, based on the determined computing device type, selection, from among the multiple computer programs, a computer program that is able to access the data identified by the sent reference address and programmatically structure and arrange the accessed data for display or use on the determined computing device type for the computing device seeking access to the data identified by the sent reference address;

enabling translation, based on the selected computer program, of the sent reference address to a second reference address that identifies the selected computer program that is able to access the data identified by the sent reference address and programmatically structure and arrange the accessed data for display or use on the computing device seeking access to the data identified by the sent reference address;

enabling determination of whether the selected computer program is able to programmatically structure and arrange the accessed data for display or use on multiple computing device types or only a single computing device type;

enabling, conditioned on a determination that the selected computer program is able to programmatically structure and arrange the accessed data for display or use on multiple computing device types, redirection of the sent reference address to the second reference address and enabling provision, to the selected computer program identified by the second reference address, of a parameter that identifies the determined computing device type for the computing device seeking access to the data to enable the selected computer program to access the data identified by the sent reference address and programmatically structure and arrange the accessed data for display or use on the one of the multiple computing device types corresponding to the determined computing device type; and enabling, conditioned on a determination that the selected computer program is able to programmatically structure and arrange the accessed data for display or use on only a single computing device type, redirection of the sent reference address to the second reference address without provision, to the selected computer program identified by the second reference address, of a parameter that identifies the determined computing device type for the computing device seeking access to the data.

27. The method of claim 26 further comprising sending a user identity for use in translating the sent reference address to a second reference address.

28. The method of claim 26 wherein the sent reference address is a uniform resource locator.

29. A computer-accessible medium having embodied thereon a computer program configured to, when executed by a computer, redirect a request to access data in a computer network, the medium comprising one or more code segments configured to:

receive a reference address and computing device type information for a computing device seeking access to data identified by the received reference address wherein the data is accessible by multiple computer programs, each computer program being identified by a reference address and able to access the identified data and programmatically structure and arrange the accessed data for display or use on one or more particular computing device types, the multiple computer programs including at least a first computer program that is able to programmatically structure and arrange the accessed data for display or use on multiple computing device types and a second computer program that is able to programmatically structure and arrange the accessed data for display or use on a single computing device type;

determine a computing device type for the computing device seeking access to the data identified by the received reference address based on the received computing device type information;

based on the determined computing device type, select, from among the multiple computer programs, a computer program that is able to access the data identified by the received reference address and programmatically structure and arrange the accessed data for display or use on the determined computing device type for the computing device seeking access to the data identified by the received reference address;

translate, based on the selected computer program, the received reference address to a second reference address that identifies the selected computer program that is able to access the data identified by the received reference address and programmatically structure and arrange the accessed data for display or use on the computing device seeking access to the data identified by the received reference address;

determine whether the selected computer program is able to programmatically structure and arrange the accessed data for display or use on multiple computing device types or only a single computing device type;

conditioned on a determination that the selected computer program is able to programmatically structure and arrange the accessed data for display or use on multiple computing device types, redirect the received reference address to the second reference address and provide, to the selected computer program identified by the second reference address, a parameter that identifies the determined computing device type for the computing device seeking access to the data to enable the selected computer program to access the data identified by the received reference address and programmatically structure and arrange the accessed data for display or use on the one of the multiple computing device types corresponding to the determined computing device type; and conditioned on a determination that the selected computer program is able to programmatically structure and arrange the accessed data for display or use on only a single computing device type, redirect the received reference address to the second reference address without providing, to the selected computer program identified by the second reference address, a parameter that identifies the determined computing device type for the computing device seeking access to the data.

30. The medium of claim 29 wherein the one or more code segments are configured to operate on a computer system.

31. The medium of claim 29 wherein the one or more code segments are configured to operate on a computing device.

32. The medium of claim 29 wherein the one or more code segments are configured to operate on a computer that is connected to a computer network having multiple computers, including computer systems and computing devices, that are capable of providing the requested data.

33. The medium of claim 29 wherein the one or more code segments are further configured to access data using the computer program identified by the second reference address.

34. The medium of claim 29 wherein the one or more code segments configured to receive a reference address comprise one or more code segments configured to receive a uniform resource locator.

35. The medium of claim 29 wherein the one or more code segments are further configured to:
   access a redirection decision rule; and
   translate the received reference address based on the received computing device type and the accessed redirection decision rule.

36. A system for redirecting a request to access data, the system comprising a processor connected to a storage device and one or more input/output devices, wherein the processor is configured to:
   receive a reference address and computing device type information for a computing device seeking access to data identified by the received reference address wherein the data is accessible by multiple computer programs, each computer program being identified by a reference address and able to access the identified data and programmatically structure and arrange the accessed data for display or use on one or more particular computing device types, the multiple computer programs including at least a first computer program that is able to programmatically structure and arrange the accessed data for display or use on multiple computing device types and a second computer program that is able to programmatically structure and arrange the accessed data for display or use on a single computing device type;

determine a computing device type for the computing device seeking access to the data identified by the received reference address based on the received computing device type information;

based on the determined computing device type, select, from among the multiple computer programs, a computer program that is able to access the data identified by the received reference address and programmatically structure and arrange the accessed data for display or use on the determined computing device type for the computing device seeking access to the data identified by the received reference address;

translate, based on the selected computer program, the received reference address to a second reference address that identifies the selected computer program that is able to access the data identified by the received reference address and programmatically structure and arrange the accessed data for display or use on the computing device seeking access to the data identified by the received reference address;

determine whether the selected computer program is able to programmatically structure and arrange the accessed data for display or use on multiple computing device types or only a single computing device type;

conditioned on a determination that the selected computer program is able to programmatically structure and arrange the accessed data for display or use on multiple computing device types, redirect the received reference address to the second reference address and provide, to the selected computer program identified by the second reference address, a parameter that identifies the determined computing device type for the computing device seeking access to the data to enable the selected computer program to access the data identified by the received reference address and programmatically structure and arrange the accessed data for display or use on the one of the multiple computing device types corresponding to the determined computing device type; and conditioned on a determination that the selected computer program is able to programmatically structure and arrange the accessed data for display or use on only a single computing device type, redirect the received reference address to the second reference address without providing, to the selected computer program identified by the second reference address, a parameter that identifies the determined computing device type for the computing device seeking access to the data.

37. The system of claim 36 wherein the processor is configured to operate on a computing device.

38. The system of claim 36 wherein the processor is configured to operate on a computer connected to a computer network having multiple computers, including computer systems and computing devices, that are capable of providing the requested data.

39. The system of claim 36 wherein the processor is further configured to access data using the computer program identified by the second reference address.

40. The system of claim 36 wherein the processor configured to receive a reference address comprises a processor configured to receive a uniform resource locator.

41. The system of claim 36 wherein the processor is further configured to:
- access a redirection decision rule; and
- translate the received reference address based on the received computing environment information and the accessed redirection decision rule.

42. The method of claim 1 further comprising:
- when the selected computer program is the second computer program that is able to programmatically structure and arrange the accessed data for display or use on the single computing device type, redirecting the received reference address to the second reference address without providing, to the selected computer program identified by the second reference address, a parameter that identifies the determined computing device type for the computing device seeking access to the data.

43. The method of claim 42 further comprising:
- when the selected computer program is the first computer program that is able to programmatically structure and arrange the accessed data for display or use on multiple computing device types, using the first computer program to access an instance of the data from a database and to programmatically structure and arrange the accessed instance of the data for display or use on the one of the multiple computing device types identified by the parameter; and
- when the selected computer program is the second computer program that is able to programmatically structure and arrange the accessed data for display or use on the single computing device type, using the second computer program to access the instance of the data from the database and to programmatically structure and arrange the accessed data for display or use on the single computing device type.

44. The method of claim 43 wherein:
- using the first computer program to access the instance of the data from the database and to programmatically structure and arrange the accessed instance of the data for display or use on the one of the multiple computing device types identified by the parameter comprises using the first computer program to access a data object from a database table and to programmatically structure and arrange the accessed data object for display or use on the one of the multiple computing device types identified by the parameter; and
- using the second computer program to access the instance of the data from the database and to programmatically structure and arrange the accessed data for display or use on the single computing device type comprises using the second computer program to access the data object from the database table and to programmatically structure and arrange the accessed data object for display or use on the single computing device type.

45. The method of claim 1 wherein the data is a particular data object stored in a database and each of the multiple computer programs is able to access the particular data object from the database.

46. The method of claim 45 wherein the particular data object is a row in a relational database table and each of the multiple computer programs is able to access the row from the relational database table.

47. The method of claim 45 wherein the particular data object is an object instance stored in an object-oriented database and each of the multiple computer programs is able to access the object instance from the object-oriented database.

* * * * *